(12) United States Patent
Cowan

(10) Patent No.: US 10,579,682 B1
(45) Date of Patent: Mar. 3, 2020

(54) MACHINE-LEARNED DISAMBIGUATION OF USER ACTION DATA

(71) Applicant: Google Inc., Mountain View, CA (US)

(72) Inventor: Mathew Cowan, New York, NY (US)

(73) Assignee: Google LLC, Mountain View, CA (US)

( * ) Notice: Subject to any disclaimer, the term of this patent is extended or adjusted under 35 U.S.C. 154(b) by 401 days.

(21) Appl. No.: 15/493,013

(22) Filed: Apr. 20, 2017

Related U.S. Application Data

(63) Continuation of application No. 14/028,726, filed on Sep. 17, 2013, now abandoned.

(51) Int. Cl.
| | |
|---|---|
| G06F 7/00 | (2006.01) |
| G06F 17/30 | (2006.01) |
| G06F 16/903 | (2019.01) |
| G06N 20/00 | (2019.01) |
| G06F 17/00 | (2019.01) |

(52) U.S. Cl.
CPC ....... G06F 16/90335 (2019.01); G06N 20/00 (2019.01)

(58) Field of Classification Search
CPC .......................... G06F 16/90335; G06N 20/20
See application file for complete search history.

(56) References Cited

U.S. PATENT DOCUMENTS

| | | | |
|---|---|---|---|
| 6,684,201 B1 | 1/2004 | Brill | |
| 6,792,422 B1 | 9/2004 | Stride et al. | |
| 6,871,186 B1 * | 3/2005 | Tuzhilin | G06Q 30/018 379/189 |
| 7,752,535 B2 | 7/2010 | Satyavolu | |
| 7,840,456 B2 | 11/2010 | Patzer | |
| 2004/0176954 A1 * | 9/2004 | Wang | G06F 3/16 704/254 |
| 2008/0086365 A1 * | 4/2008 | Zollino | G06Q 30/02 705/7.31 |
| 2008/0195438 A1 * | 8/2008 | Manfredi | G06Q 40/02 |
| 2009/0248687 A1 * | 10/2009 | Su | G06F 16/2458 |
| 2010/0153242 A1 | 6/2010 | Preston et al. | |
| 2011/0035280 A1 * | 2/2011 | Fordyce, III | G06Q 20/10 705/14.53 |
| 2014/0136381 A1 | 5/2014 | Joseph et al. | |
| 2014/0244462 A1 | 8/2014 | Maenpaa et al. | |

* cited by examiner

*Primary Examiner* — Kannan Shanmugasundaram

(74) *Attorney, Agent, or Firm* — Fish & Richardson P.C.

(57) ABSTRACT

Methods, systems, and apparatus, including computer programs encoded on a computer storage medium, for receiving data that represents actions taken by a particular user with respect to entities of a plurality of entity types, disambiguating the data by identifying entities specified in the data using a machine learning based annotator that is trained to recognize entities and annotating the data, receiving a query specific from the particular user, querying the data that represents actions taken by the particular user, generating an answer to the query from the data representing the actions taken by the particular user, and providing the answer to the query.

18 Claims, 3 Drawing Sheets

MACHINE-LEARNED DISAMBIGUATION OF USER ACTION DATA

CROSS-REFERENCE TO RELATED APPLICATION

This is a continuation of U.S. application Ser. No. 14/028,726, filed on Sep. 17, 2013, the disclosure of which is considered part of and is incorporated by reference in the disclosure of this application.

TECHNICAL FIELD

This specification generally relates to improving the operation of a computer.

BACKGROUND

Financial transaction data may be used to represent financial transactions. For example, a credit card statement may include financial transaction data that represents financial transactions made using a particular credit card. Financial transaction data may include a date, description, and amount corresponding to a particular financial transaction. For example, financial transaction data, ["4/12/2013," "ITALIAN DELI NEW YORK NY," "12.08"], may represent a credit card charge for $12.08 for a financial transaction that occurred on Apr. 12, 2013, at a restaurant named "Italian Deli" located in New York, N.Y.

SUMMARY

In general, an aspect includes receiving data that represents actions taken by a particular user with respect to entities of a plurality of entity types, disambiguating the data by identifying entities specified in the data using a machine learning based annotator that is trained to recognize entities and annotating the data, receiving a query specific from the particular user, querying the data that represents actions taken by the particular user, generating an answer to the query from the data representing the actions taken by the particular user, and providing the answer to the query.

In some implementations, the system may receive data that represents actions take n by a particular user with respect to entities of a plurality of entity types, where the data for a plurality of the entities is determined to be ambiguous because the entities cannot be determined. The system disambiguates the data that represents actions taken by a particular user with respect to entities of a plurality of entity types. The disambiguating can include identifying, by the system, entities specified in the data for the plurality of entities determined to be ambiguous, using a machine learning based annotator that is trained to recognize entities and entity attributes of the entities in the data and annotating, by the system the data that represents actions taken by a particular user with respect to entities of a plurality of entity types with respective entity identifier that each identify a particular entity. The system receives a query specific from the particular from the particular user, wherein the query includes one or more terms that indicate a first entity type of one or more entities and an action taken by the user with respect to the one or more entities. The system determines one or more entities that are of the first entity type and queries the data that represents actions taken by the user with respect to entities of the first entity type. The system generates an answer to the query form the data that represents the actions taken by the particular user with respect to entities of the first entity type and provides the answer to the query specific to the particular user.

In some implementations, the data may be transaction data, such as financial transaction data. The system may receive financial transaction data that represents a financial transaction. The financial transaction data may include credit card transaction data, debit card transaction data, or financial statement transaction data.

The system may analyze financial transaction data to provide information regarding the financial transactions. For example, the system may categorize financial transactions so that a user may view the amount or percentage that the user spent in particular categories. A category may include "restaurants," and the system may categorize the financial transaction at the restaurant "Italian Deli" under restaurants as the corresponding financial transaction data includes the word "Deli." However, financial transaction data may be more ambiguous. For example, financial transaction data ["4/11/2013," "BEST R NEW YORK NY," "45.78"] may be ambiguous.

To disambiguate financial transaction data, the system may use a machine-learning based annotator that identifies entities associated with financial transaction data. Entities may be a business entity, e.g., a particular store, restaurant, office, or company. For example, the machine-learning based annotator may identify that an entity named "Best Restaurant" located in New York, N.Y. is associated with the financial transaction data.

The machine-learning based annotator may be trained to identify entities associated with financial transaction data based on labeled training data. For example, the machine-learning based annotator may be trained to determine that financial transaction data including locations, e.g., "NEW YORK NY," "DC," or "90210," are likely to be associated with entities associated with the locations. In another example, the machine-learning based annotator may be trained to determine that a single letter, e.g., "R," may be an abbreviation for a word that begins with the letter in an entity's name. Accordingly, the machine-learning based annotator may determine based on the presence of "NEW YORK NY," "BEST," and "R," that the financial transaction data is associated with the entity named "Best Restaurant" located in New York, N.Y.

The machine-learning based annotator may be trained to only analyze the description in the financial transaction data, or to analyze additional information in the financial transaction data, e.g., amount and date, as well. For example, the machine-learning based annotator may further determine the financial transaction is associated with the entity "Best Restaurant" based on considering the amount and the date. The annotator may determine that the amount of $45.78 is consistent with the amount that would be spent at the restaurant "Best Restaurant" and that the user that was a party to the financial transaction was in New York, N.Y. on Apr. 11, 2013, based on the user's profile.

The labeled training data used to train the machine-learning based annotator may include text and entities identified as being associated with the text. For example, the machine-learning based annotator may be trained using excerpts of the website for "Best Restaurant" that are identified as being associated with the entity "Best Restaurant." The labeled training data may include other non-financial transaction related data, e.g., text from a review website, associated with identified entities, social network interactions of users, search terms used by users, or user provided training data including explicit confirmations that entities identified are correct or incorrect. Additionally, or alternatively, the labeled training data may include financial transaction data associated with identified entities. For example, the label training data may include financial transaction data representing financial transactions at restaurants including "Best Restaurant."

The system may associate the financial transactions with entities identified by the machine-learning based annotator. The system may annotate financial transaction data with data that includes an identifier that represents the identified entity. For example, the system may annotate the financial transaction data ["4/11/2013," "BEST R NEW YORK NY," "45.78"] with an entity identifier "00542687" to result in annotated financial transaction data ["4/11/2013," "BEST R NEW YORK NY," "45.78," "00542687"] where "00542687" is a unique identifier for the entity "Best Restaurant."

The system may store entity data regarding the entity. For example, entity data for an entity that is a restaurant may include a restaurant name, address, phone number, hours, dining style, cuisine type, executive chef name, and price range. An entity for a clothing store may include a store name, type of clothing, target audience, hours, and price range. Other types of entities may include other values for other properties.

Using the annotated financial transaction data, the system may provide information regarding financial transactions. For example, if a user requests that the system identify what restaurant the user ate at on Apr. 11, 2013, the system may identify, based on the annotated financial transaction data, financial transactions that occurred on Apr. 11, 2013, and that are associated with an entity that is a restaurant, and return the result of the restaurant "Best Restaurant."

In some aspects, the subject matter described in this specification may be embodied in methods that may include the actions of obtaining particular financial transaction data that represents a particular financial transaction and providing the particular financial transaction data to a machine-learning based annotator that identifies entities associated with financial transaction data. Additional actions may include associating the particular financial transaction with an entity that is identified by the machine-learning based annotator for the particular financial data.

In some aspects, the subject matter described in this specification may be embodied in methods that may include the actions of receiving a query from a user that was a party to a particular financial transaction and determining an entity type associated with the query. Additional actions may include determining that an entity associated with the particular financial transaction matches the entity type associated with the query. Further actions may include providing, in response to the query, a response that identifies the entity.

Other versions include corresponding systems, apparatus, and computer programs, configured to perform the actions of the methods, encoded on computer storage devices.

These and other versions may each optionally include one or more of the following features. For instance, in some implementations the financial transaction data may include one or more of credit card transaction data, debit card transaction data, or financial statement transaction data.

In certain aspects, associating the particular financial transaction with an entity that is identified by the machine-learning based annotator may include annotating the particular financial transaction data with an identifier that represents the identified entity.

In some aspects, the actions may include receiving data identifying candidate entities from the machine-learning based annotator and selecting the entity that is associated with the particular financial transaction from the identified candidate entities based on a user profile of a user that was a party to the particular financial transaction.

In some implementations, selecting the entity that is associated with the particular financial transaction from the candidate entities based on a user profile may include determining that, on a date indicated by the financial transaction data, the user profile indicates that the user was located in a location associated with the entity.

In certain aspects, the machine-learning based annotator is trained using labeled training data. In some aspects, the machine-learning based annotator is trained using labeled training data. In some implementations, the machine-learning based annotator is trained using labeled training data.

In certain aspects, the actions may include receiving a query from a user that was a party to the particular financial transaction and determining an entity type associated with the query. Additional actions may include determining that the entity associated with the particular financial transaction matches the entity type associated with the query and providing, in response to the query, a response that identifies the entity.

The details of one or more implementations of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1:
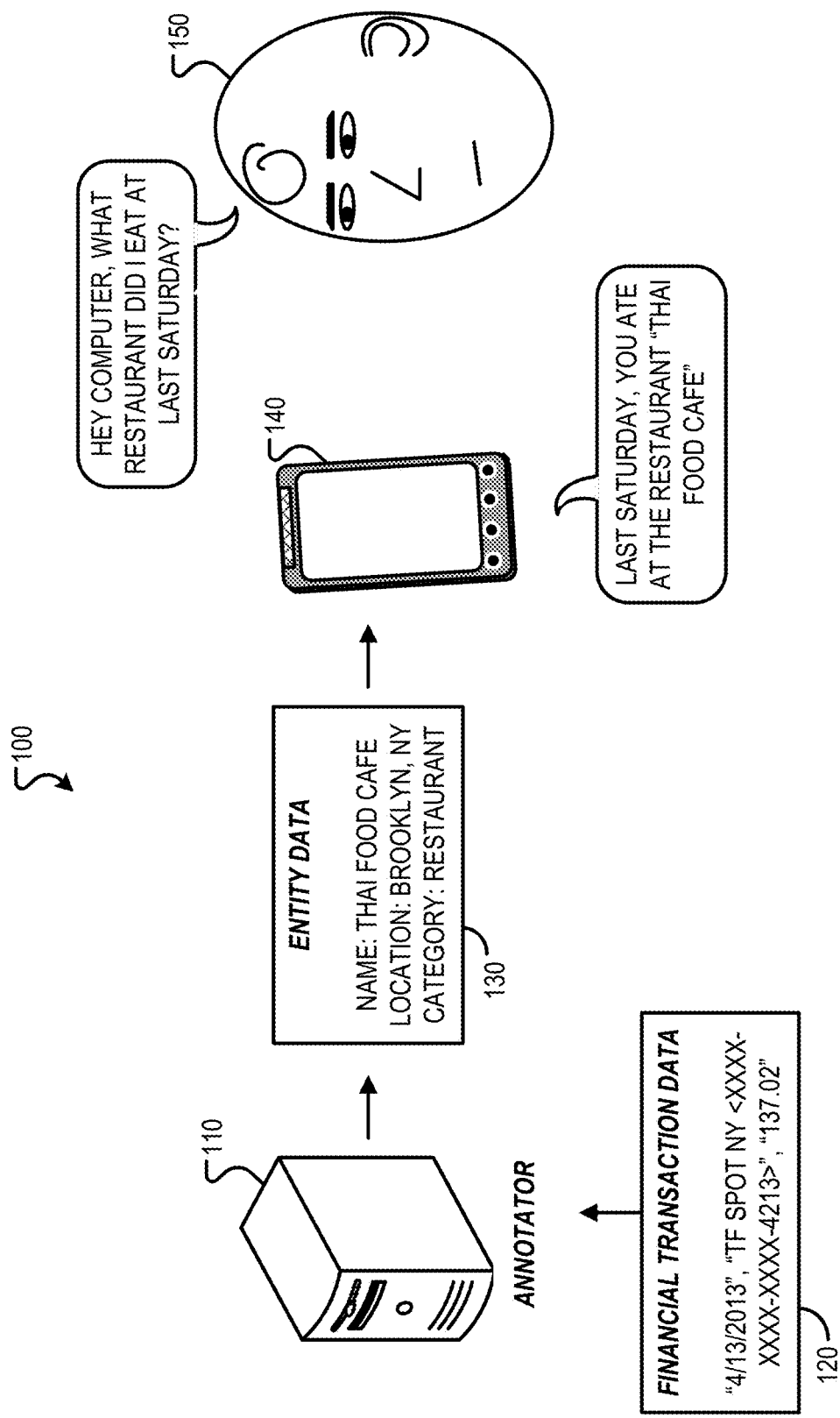
FIG. 1 is a diagram of an example system for disambiguating financial transaction data.

In general, an aspect of the subject matter described in this specification may involve a process for disambiguating financial transaction data. The system may receive financial transaction data that represents a financial transaction. The financial transaction data may include credit card transaction data, debit card transaction data, and financial statement transaction data.

Financial transaction data may include a date, description, and amount corresponding to a particular financial transaction. For example, financial transaction data, ["4/08/2013," "FISH TACO AND WRAPS SAN DIEGO CA," "16.08"], may represent a credit card charge for $16.08 that occurred on Apr. 8, 2013, at a restaurant named "Fish Taco and Wraps" located in San Diego, Calif.

The system may analyze financial transaction data to provide information regarding the financial transactions. For example, the system may categorize financial transactions so that a user may view the amount or percentage that the user spent in particular categories. A category may include "restaurants," and the system may categorize the financial transaction at the restaurant "Fish Taco and Wraps" under restaurants as the corresponding financial transaction data includes the phrase "Taco and Wraps." However, financial transaction data may be more ambiguous. Financial transaction data may be considered ambiguous if the identity of the other party to the financial transaction cannot be determined with any certainty from the financial transaction data, and conversely financial transaction data may be considered unambiguous if the identity of the other party to the financial transaction can be determined with any certainty from the financial transaction data. For example, financial transaction data ["4/11/2013," "B REST New York N.Y.," "45.78"] may be ambiguous because even though a location, date, and amount of the financial transaction may be apparent, the identity of the other party to the financial transaction represented by the financial transaction data may not be able to be determined with any certainty.

To disambiguate financial transaction data, the system may use a machine-learning based annotator that identifies entities associated with financial transaction data. Identifying an entity associated with financial transaction data may disambiguate the financial transaction data by identifying the other party with which the user transacted in the financial transaction represented by the financial transaction data. Entities may be a business entity, e.g., a particular store, restaurant, office, or company. For example, the machine-learning based annotator may identify that an entity named "Best Restaurant" located in New York, N.Y. is associated with the financial transaction data.

The machine-learning based annotator may be trained to identify entities associated with financial transaction data based on labeled training data. For example, the machine-learning based annotator may be trained to determine that financial transaction data including locations, e.g., "NEW YORK NY," "CA," or "90210," are likely to be associated with entities associated with the locations. In another example, the machine-learning based annotator may be trained to determine that a single letter, e.g., "B," may be an abbreviation for a word that begins with the letter in an entity's name. Accordingly, the machine-learning based annotator may determine based on the presence of "NEW YORK NY," "B," and "REST," that the financial transaction data is associated with the entity named "Best Restaurant" located in New York, N.Y.

The machine-learning based annotator may be trained to only analyze the description in the financial transaction data or analyze additional information as well. For example, the machine-learning based annotator may further determine the financial transaction is associated with the entity "Best Restaurant" based on considering the amount and the date. The annotator may determine that the amount of $45.78 is consistent with the amount that would be spent at the restaurant "Best Restaurant" and that the user that was a party to the financial transaction was in New York, N.Y. on Apr. 11, 2013, based on the user's profile.

The labeled training data used to train the machine-learning based annotator may include text and entities identified as being associated with the text. For example, the machine-learning based annotator may be trained using excerpts of the website for "Best Restaurant" that are identified as being associated with the entity "Best Restaurant." The labeled training data may include other non-financial transaction related data, e.g., text from a review website associated with identified entities. Additionally, or alternatively, the labeled training data may include financial transaction data associated with identified entities. For example, the label training data may include financial transaction data representing financial transactions at restaurants including "Best Restaurant." Using label training data that includes financial transaction data that has been explicitly associated with "Best Restaurant" may enable the system to determine that input financial transaction data is similar or identical to the other financial transaction data and should also be explicitly associated with "Best Restaurant."

The system may associate the financial transactions with entities identified by the machine-learning based annotator. The system may annotate financial transaction data with data that includes an identifier that represents the identified entity. For example, the system may annotate the financial transaction data ["4/11/2013," "B REST NEW YORK NY," "45.78"] with an entity identifier "00542687" to result in annotated financial transaction data ["4/11/2013," "B REST NEW YORK NY," "45.78," "00542687"] where "00542687" is a unique identifier for the entity "Best Restaurant."

The system may associate the entity identifier with entity data regarding the entity. For example, entity data for an entity that is a restaurant may include a restaurant name, address, phone number, hours, dining style, cuisine type, executive chef name, and price range. An entity for a clothing store may include a store name, type of clothing, target audience, hours, and price range. Other types of entities may include other properties for other values. The entity identifier may be stored by the system in association with various financial transactions, and the system may use the entity identifier to identify the entity data for the various financial transactions.

Using the annotated financial transaction data, the system may provide information regarding financial transactions. For example, if a user requests that the system identify what restaurant the user ate at on Apr. 11, 2013, the system may identify, based on the annotated financial transaction data, financial transactions that occurred on Apr. 11, 2013 and that are associated with an entity that is a restaurant, and return the result of the restaurant "Best Restaurant."

FIG. 1 is a diagram of an example system 100 for disambiguating financial transaction data. Generally, the system 100 includes a machine-learning based annotator 110 that disambiguates financial transaction data that represent financial transactions and a client device 140 that enables a user to interact with the server 110 to request information regarding the financial transactions.

The annotator 110 may be one or more processing devices that receive financial transaction data 120. For example, the financial transaction data 120 may include particular financial transaction data ["4/13/2013," "TF SPOT NY<XXXX-XXXX-XXXX-4213>," "137.02"] that represents a particular financial transaction made on Apr. 13, 2013, at the restaurant "Thai Food Spot" using a credit card that ends in the numbers "4213" for the amount of $137.02.

The annotator 110 may receive the financial transaction data 120 and disambiguate the financial transaction data 120 by identifying an entity that is associated with the financial transaction data 120. For example, the annotator 110 may identify that the entity that is the restaurant "Thai Food Spot" is associated with the particular financial transaction data. As explained in more detail regarding FIG. 2, the annotator 110 may identify entities based on learning patterns associated with the entities, recognizing the patterns in financial transaction data without identified associated entities, and identifying the entities as associated with the financial transaction data based on recognizing the patterns.

The annotator 110 may associate the identified entity with the financial transaction. The annotator 110 may associate the identified entity with the financial transaction by annotating financial transaction data with data that includes an identifier that represents the identified entity. For example, the annotator 110 may associate the restaurant "Thai Food Spot" with the particular financial transaction represented by the particular financial transaction data by adding a unique identifier for "Thai Food Spot" to the particular financial transaction data.

Additionally, or alternatively, the annotator 110 may associate the identified entity with a user profile of the user that is a party to the financial transaction. For example, if the user subscribes to a service that is billed to the user by a service provider, e.g., an Internet service provider, cellular service provider, or media service provider, the annotator 110 may recognize that the user is a subscriber of the service based on the identification of the entity. The annotator 110 may then annotate the user profile of the user to indicate that the user is a subscriber of a service from the identified entity. The annotation in the user profile may be used to customize an experience of the user. For example, a search engine may identify that the user is a subscriber of a service from a particular media service provider based on an annotation in the user profile and in response, rank search results associated with the particular media service provider higher than search results that are not associated with the particular media service provider.

In associating an entity with a particular financial transaction, the annotator 110 may associate entity data 130 for the entity with the financial transaction. Entity data 130 may be data describing the entity, e.g., name, address, category, and other properties for an entity. For example, the entity data for the restaurant "Thai Food Spot" may include the name "Thai Food Spot," the location "BROOKLYN, NY," and the category "RESTAURANT."

The annotator 110 may associate an entity with a particular financial transaction on a single financial transaction basis. For example, the annotator 110 may receive financial transaction data representing a particular financial transaction, and wait until the annotator 110 associates an entity with the particular financial transaction before the annotator 110 receives additional financial transaction data representing another financial transaction. Alternatively, the annotator 110 may receive financial transaction data representing multiple financial transactions and associate entities with the financial transactions one by one. Additionally or alternatively, the annotator 110 may associate entities with particular financial transactions on a batch basis. For example, the annotator 110 may receive financial transaction data representing multiple financial transactions, and associate two or more of the financial transactions with entities in parallel. The annotator 110 may use financial transaction data representing a first financial transaction to disambiguate financial transaction data representing a second financial transaction while also using financial transaction data representing the second financial transaction to disambiguate the first financial transaction data.

The entity data associated with a financial transaction by the annotator 110 may be used to provide information regarding financial transactions to a user 150. The annotator 110 may receive a request for information from a client device 140, e.g., a mobile phone, a tablet, a laptop computer, a desktop computer. For example, the request for information may be a request for the identification of the restaurant that the user 150 ate at the previous Saturday.

The client device 140 may send the request for information to the annotator 110 in response to input from the user 150. For example, the user 150 may say, "Hey Computer, what restaurant did I eat at last Saturday?" Additionally or alternatively, the user 150 may input the request using a keyboard, touchpad, or mouse. For example, the client device 140 may provide an interface where a user may select a date and a category from a number of selections. Different requests may also include requests for the amount of money the user spent last week, e.g., "Hey Computer, how much money did I spend on groceries last week?" or how much the user spent while in a certain location, e.g., "Hey Computer, how much money did I spend in Paris last month?"

The annotator 110 may receive the request and provide a response to the request based on the entities the annotator 110 associated with financial transactions. For example, for a request for what restaurant the user ate at last Saturday, the annotator 110 may identify the financial transactions that occurred last Saturday that the annotator 110 associated with entities that falls under the category of "RESTAURANT." Accordingly, the annotator 110 may determine that the user ate at the restaurant "Thai Food Spot" last Saturday and send entity data for the restaurant to the client device 140. The client device 140 may then provide a response including the entity data to the user 150. For example, the client device 140 may output "LAST SATURDAY, YOU ATE AT THE RESTAURANT 'THAI FOOD CAFE.'"

In another example where the request is for how much money the user spent on groceries last week, the annotator 110 may identify financial transactions that occurred last week that the annotator 110 associated with an entity that falls under the category of "GROCERY STORE." The annotator 110 may then sum the amounts indicated in the financial transaction data representing those identified financial transactions and provide the sum to the client device 140. The client device 140 may then output, "LAST WEEK, YOU MADE 2 TRANSACTIONS AT GROCERY STORES FOR A TOTAL OF $243.13."

Different configurations of the system 100 may be used where functionality of the annotator 110 and client device 140 may be combined, further distributed, or interchanged. The system 100 may be implemented in a single device or distributed across multiple devices.

Figure 2:
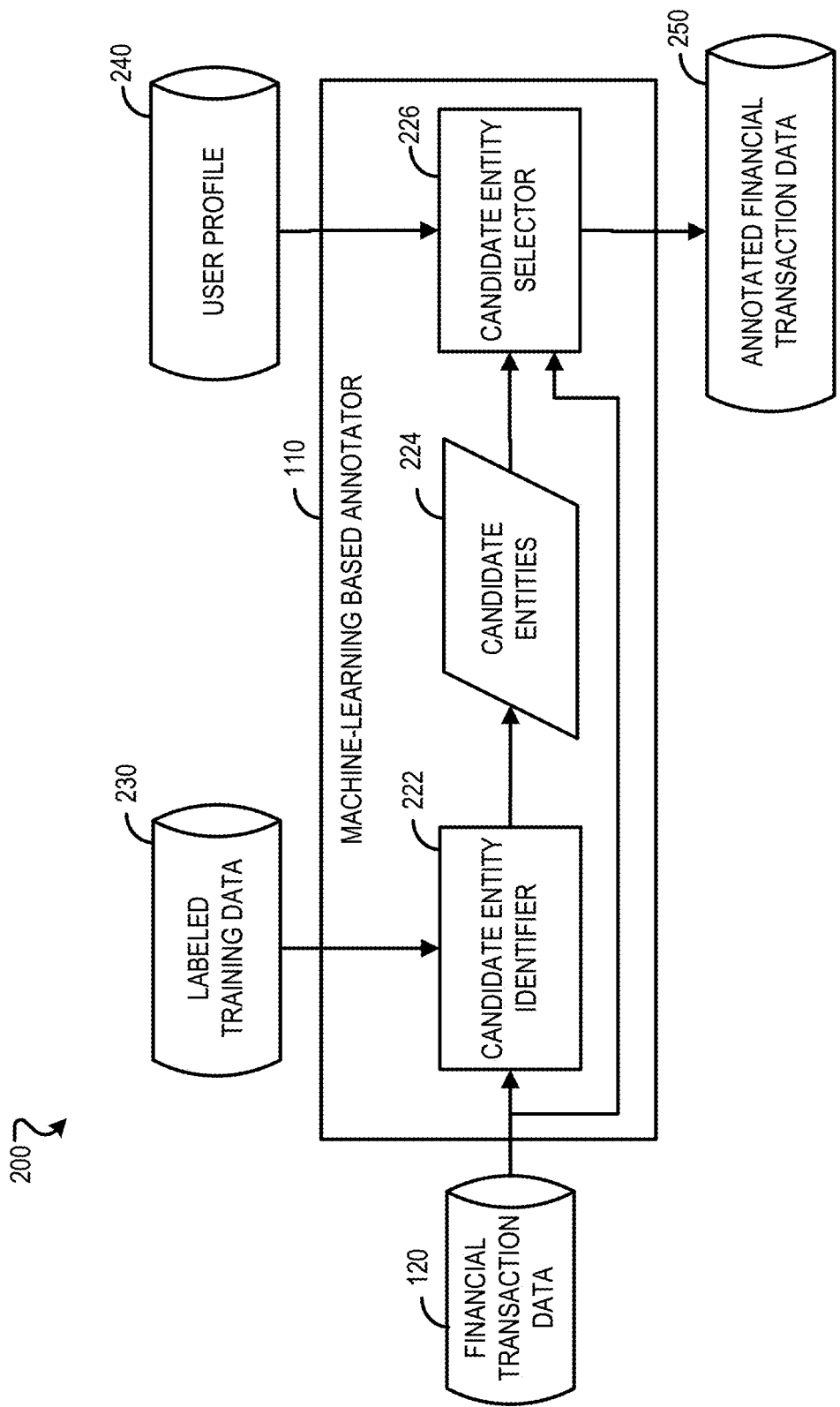
FIG. 2 is a block diagram of an example system for disambiguating financial transaction data.

FIG. 2 is a block diagram of an example system 200 for disambiguating financial transaction data. Generally, the system 200 includes financial transaction data 120 representing financial transactions, a machine-learning based annotator 110 that associates entities with financial transactions, labeled training data 230 for training the machine-learning based annotator 110, a user profile 240 for a user that is a party to a financial transaction, and annotated financial transaction data 250.

The machine-learning based annotator 110 may include a candidate entity identifier 222 that identifies candidate entities 224 that may be associated with financial transaction data, and a candidate entity selector 226 that selects one or more candidate entities from the candidate entities 224 to associate with the financial transactions. The identifier 222 may be machine-learning based and be initially trained using the labeled training data 230.

For example, the identifier 222 may be trained based on patterns the identifier 222 has learned from the labeled training data 230 to determine that for the particular financial transaction data ["4/13/2013," "TF SPOT NY <XXXX-XXXX-XXXX-4213>," "137.02"], "NY" which may be associated with New York City or New York state, "TF" is not a dictionary word and may be an acronym, restaurants typically include the last four digits of a credit card at the end of a description in financial transaction data 120, and that four digits preceded by "<XXXX-XXXX-XXXX-" is likely to be the last four digits of a credit card number. Accordingly, the identifier 222 may identify entities that match a pattern of (i) being associated with either New York City or New York state, (ii) having a name that includes a word that begins with "T," followed by a word that beings with "F,"

followed by the word "SPOT," or having a name that includes a pattern that's similar to a pattern in the description of the financial transaction data, and (iii) being categorized as a restaurant. The identifier 222 may determine that the restaurant "Thai Food Spot" is the only entity that matches all the criteria, e.g., includes a pattern that is identified as being most similar to the pattern in the particular financial transaction data, but also determine that a restaurant named "Tofo Spot" in New York City is a slightly less likely match as "TF" may be an abbreviation for "TOFU," but more likely to be an abbreviation for "THAI FOOD."

The identifier 222 may be trained to only analyze the description in the financial transaction data, or to analyze additional information as well. For example, the identifier 222 may determine the financial transaction is associated with the restaurant "Thai Food Spot" further based on considering the amount and the date indicated in the financial transaction data. The identifier 222 may determine that the financial transaction occurred on a Saturday, that "Thai Food Spot" is more popular than "Tofu Spot" on a Saturday, that "Thai Food Spot" is an expensive restaurant, that "Tofu Spot" is an inexpensive restaurant, and that the amount of $137.02 is more consistent with the amount that would be spent at an expensive restaurant.

Additionally or alternatively, the identifier 222 may be trained to recognize and associate particular textual formats with particular entities. The identifier 222 may recognize order numbers in financial transaction data 120 and associate particular formats of order numbers with particular entities. For example, a particular business may use order numbers that are nine alphanumeric digits preceded by the "#" symbol, e.g., "#00010A2C5," while another business may use order numbers that are ten numeric digits, e.g., "0015432421."

The identifier 222 may be trained using labeled training data 230. The labeled training data 230 may be a corpus of text that is identified as being associated with particular entities. The labeled training data 230 may include webpages from the websites of entities where a webpage from a particular entity's website is identified as being associated with the particular entity. For example, the identifier 222 may be trained using webpages from the website for "Thai Food Spot" identified as being associated with "Thai Food Spot" so that when the identifier 222 receives financial transaction data associated with "Thai Food Spot" with some similarities to the text that appeared on the website for "Thai Food Spot," the identifier 222 may identify the input as being associated with the restaurant "Thai Food Spot." The labeled training data may additionally or alternatively include other non-financial transaction related data, e.g., data from a review website, news articles, investment material, marketing material, social network, shopping search corpus, patent search corpus, book search corpus, news search corpus, sales offer corpus, general search corpus, translation corpus, image hosting website, or video hosting website, associated with identified entities or users. Labeled training data may also include explicit confirmations from users that entities identified for financial transactions are correct or incorrect Additionally, or alternatively, the labeled training data may include financial transaction data associated with identified entities. For example, the label training data may include financial transaction data representing financial transactions at restaurants including "Thai Food Spot." The financial transaction data included in the labeled training data may be financial transaction data representing actual financial transactions, which may include financial transactions with "Thai Food Spot," or information describing the format of financial transaction data, which may include a format for financial transaction data with "Thai Food Spot."

Based on identifying candidate entities 224, the identifier 222 may also determine a confidence score for each identified entity that corresponds to how confident the identifier 222 is that the identified entity is associated with the financial transaction data. For example, the identifier 222 may determine a confidence score of "80%" with "Thai Food Spot" and "60%" with "Tofu Spot," where a higher percentage score indicates that the entity is more likely to be associated with the financial transaction data.

The candidate entity selector 226 may receive the identified candidate entities 224 and select one or more candidate entities to associate with the financial transaction. To make the selection, the selector 226 may also receive user profiles of users that are parties to financial transactions represented by financial transaction data. For example, the selector 226 may determine that the financial transaction data is for a financial transaction that included "John Doe" as a party, and in response, retrieve the user profile for "John Doe."

The user profile 240 may include information regarding the user. For example, the user profile 240 for "John Doe" may include information describing one or more of where "John Doe" lives, where "John Doe" was each day, "John Doe's" favorite types of restaurants, and "John Doe's" spending habits.

The selector 226 may use the information regarding the user to determine one or more candidate entities from the identified candidate entities that are more likely to be associated with the financial transaction data and select the one or more determined candidate entities. For example, the selector 226 may receive "Thai Food Spot" and "Tofu Spot," and determine using the information regarding "John Doe" that "Tofu Spot" is more likely to be correct.

The selector 226 may determine one or more candidate entities from the identified candidate entities based on the information regarding the user. For example, the selector 226 may determine "Thai Food Spot" is more likely than "Tofu Spot" to be associated with financial transaction data representing a financial transaction that a user was a party of by determining one or more of that (i) on a date indicated by the financial transaction data, the user profile of the user indicates that the user was located in a location associated with "Thai Food Spot" on that date, (ii) the user profile indicates the user likes Thai food, (iii) on a date indicated by the financial transaction data, the user profile of the user indicates that the user was not located in a location associated with "Tofu Spot" on that date, and (iv) the user profile indicates the user does not like tofu.

Where the selector 226 receives confidence scores determined for the candidate entities 224, the selector may also make a determination based on the confidence scores. The confidence scores may be used as weights or additional factors. For example, if "Thai Food Spot" had a very low confidence score of "5%" and "Tofu Spot" had a very high confidence score of "95%," the selector 226 may select "Tofu Spot" even though the user profile may indicate that "Tofu Spot" is unlikely to be associated with the financial transaction data.

The selector 226 may also use machine-learning. For example, the selector 226 may be trained to select candidate entities based on labeled selection training data. The labeled selection training data may include identified candidate entities, user profiles, and a selected candidate entity.

The selector 226 may associate selected entities with financial transactions to generate annotated financial transaction data 250. The selector 226 may associate a particular financial transaction with a selected entity based on annotating the particular financial transaction representing the particular financial transaction with an identifier that represents the identified entity. For example, the selector 226 may associate the particular financial transaction represented by the financial transaction data "4/13/2013," "TF SPOT NY <XXXX-XXXX-XXXX-4213>," "137.02" with "Thai Food Spot" by adding a unique identifier for "Thai Food Spot," e.g., "00542888," to the financial transaction data.

In an alternate configuration, the annotator 110 may include a combination of the identifier 222 and the selector 226. The combined identifier and selector may receive financial transaction data 120, labeled training data 230, and user profile data 240 to generate annotated financial transaction data 250. Using the combined identifier and selector, one or more entities may be associated with financial transactions without first determining candidate entities.

In another configuration, the annotator 110 may not include a selector 226 and may not consider a user profile 240 in generating entity associated financial transaction data. For example, the identifier 222 may identify a single candidate entity that is most likely to be associated with the financial transaction data and the identified candidate entity may be associated with the financial transaction represented by the financial transaction data.

Figure 3:
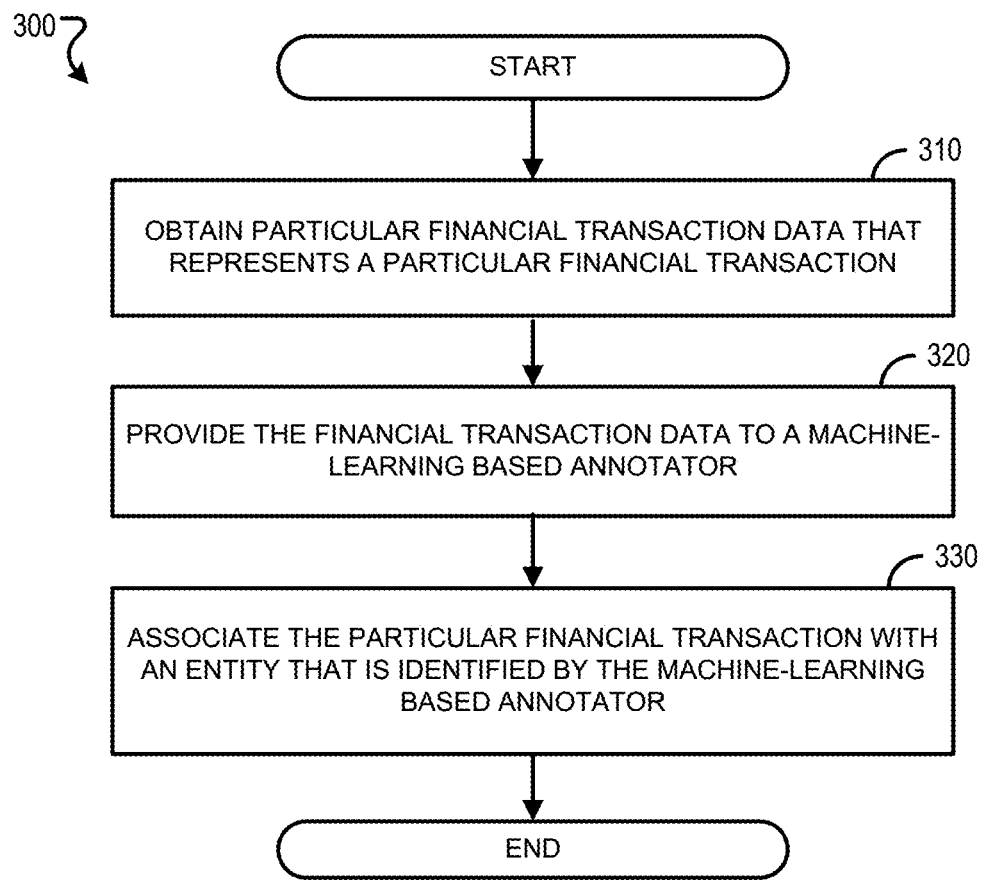
FIG. 3 is a flowchart of an example process for disambiguating financial transaction data.

FIG. 3 is a flowchart of an example process 300 for disambiguating financial transaction data. The following describes the processing 300 as being performed by components of the system 100 that are described with reference to FIGS. 1 and 2. However, the process 300 may be performed by other systems or system configurations.

The process 300 may include obtaining particular financial transaction data that represents a particular financial transaction (310). For example, the system 100 may obtain financial transaction data "4/20/13," "S. LAUNDRY SERVICE," "18.24" that may represent a debit card charge on Apr. 20, 2013 for the amount of $18.24 at a laundry store named "Sharon's Laundry Service."

The process 300 may include providing the financial transaction data to a machine-learning based annotator (320). For example, the system 100 may provide the particular financial transaction data to the machine-based learning annotator 110. As described above, particularly in respect to FIG. 2, the machine-based learning annotator may identify an entity that is associated with the particular financial transaction data, e.g., identify one or more candidate entities and select an identified candidate entity.

The process 300 may include associating the particular financial transaction with an entity that is identified by the machine-learning based annotator (330). For example, the annotator 110 may associate a selected identified candidate entity with a particular financial transaction by associating the selected identified candidate entity with the particular financial transaction data representing the particular financial transaction.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps may be provided, or steps may be eliminated, from the described processes. Accordingly, other implementations are within the scope of the following claims.

What is claimed is:
1. A computer-implemented method comprising:
receiving, by the system, data that represents actions taken by a particular user with respect to entities of a plurality of entity types, wherein entities specified in the data are determined to be ambiguous because the entities are not specified by the names of the entities;
disambiguating the data that represents actions taken by the particular user with respect to entities of the plurality of entity types using a machine learning based annotator, the disambiguating including:
identifying, by the system, entities that are specified in the data and that are determined to be ambiguous;
determining, by the system and using the machine learning based annotator that is trained to recognize entities and entity attributes of the entities in the data, entity identifiers for the entities that are determined to be ambiguous;
identifying, by the system and using the machine learning based annotator, multiple candidate entities for each entity of the entities based in part on the entity identifiers for the entities determined to be ambiguous;

selecting, by the system and using the machine learning based annotator, a particular entity of the multiple candidate entities for each entity of the entities based in part on information in a user profile of the particular user; and annotating, by the system and using the machine learning based annotator, the data that represents actions taken by a particular user with respect to the entities of the plurality of entity types with the respective entity identifiers that each identify the particular entity;

receiving, by the system, a query from the particular user, wherein the query includes one or more terms that specify one or more entity identifiers indicative of a first entity type and an action taken by the particular user with respect to the entities;

determining, by the system, entities that are of the first entity type;

querying, by the system and within the disambiguated data that represents actions taken by the particular user with respect to entities, for actions taken by the particular user with respect to entities of the first entity type;

generating, by the system, an answer to the query from the disambiguated data that represents the actions taken by the particular user with respect to entities of the first entity type; and providing, by the system, the answer to the query to the particular user.

2. The method of claim 1, wherein the system receives a query specific from the particular user by voice inputs from the particular user to the system.

3. The method of claim 1, wherein the system receives a query specific from the particular user by keyboard, mouse, or touchpad inputs from the particular user to the system.

4. The method of claim 1, wherein querying, by the system, the data that represents actions includes:
obtaining search results responsive to the one or more terms of the query.

5. The method of claim 1, further comprising:
associating at least one identified entity with a user profile by annotating the user profile with the identified entity; and
customizing the experience of the particular user using the annotated user profile.

6. The method of claim 1, wherein the machine-learning based annotator identifies the entity based at least on content of the data that represents actions taken by the particular user.

7. The method of claim 4, wherein generating an answer further comprises aggregating results based on a date or category.

8. A system comprising:
one or more computers; and
one or more storage devices storing instructions that are operable, when executed by one or more computers, to cause the one or more computers to perform operations comprising:
receiving data that represents actions taken by a particular user with respect to entities of a plurality of entity types, wherein entities specified in the data are determined to be ambiguous because the entities are not specified by the names of the entities;
disambiguating the data that represents actions taken by the particular user with respect to entities of the plurality of entity types using a machine learning based annotator, the disambiguating including:
identifying entities that are specified in the data and that are determined to be ambiguous;
determining, using the machine learning based annotator that is trained to recognize entities and entity attributes of the entities in the data, entity identifiers for the entities that are determined to be ambiguous;
identifying, using the machine learning based annotator, multiple candidate entities for each entity of the entities based in part on the entity identifiers for the entities determined to be ambiguous;
selecting, using the machine learning based annotator, a particular entity of the multiple candidate entities for each entity of the entities based in part on information in a user profile of the particular user; and
annotating, using the machine learning based annotator, the data that represents actions taken by a particular user with respect to the entities of the plurality of entity types with the respective entity identifiers that each identify the particular entity;
receiving a query from the particular user, wherein the query includes one or more terms that specify one or more entity identifiers indicative of a first entity type and an action taken by the particular user with respect to the entities;
determining entities that are of the first entity type;
querying, within the disambiguated data that represent actions taken by the particular user with respect to entities, for actions taken by the particular user with respect to entities of the first entity type;
generating an answer to the query from the disambiguated data that represent the actions taken by the particular user with respect to entities of the first entity type; and
providing the answer to the query to the particular user.

9. The system of claim 8, wherein a query specific from the particular user is received from the particular user by voice inputs from the particular user to the system.

10. The system of claim 8, wherein a query specific from the particular user is received from the particular user by keyboard, mouse, or touchpad inputs from the particular user to the system.

11. The system of claim 8, wherein querying the data that represents actions includes:
obtaining search results responsive to the one or more terms of the query.

12. The system of claim 8, wherein the instructions further comprise:
associating at least one identified entity with a user profile by annotating the user profile with the identified entity; and
customizing the experience of the particular user using the annotated user profile.

13. The system of claim 8, wherein the machine-learning based annotator identifies the entity based at least one content of the data that represents actions taken by the particular user.

14. The system of claim 11, wherein generating an answer further comprises aggregating results based on a date or a category.

15. One or more non-transitory computer-readable storage mediums comprising instructions stored thereon that are executable by a processing device and upon such execution cause the processing device to perform operations comprising:

receiving data that represents actions taken by a particular user with respect to entities of a plurality of entity types, wherein entities specified in the data are determined to be ambiguous because the entities are not specified by the names of the entities;

disambiguating the data that represents actions taken by the particular user with respect to entities of the plurality of entity types using a machine learning based annotator, the disambiguating including:

identifying entities that are specified in the data and that are determined to be ambiguous;

determining, using the machine learning based annotator that is trained to recognize entities and entity attributes of the entities in the data, entity identifiers for the entities that are determined to be ambiguous;

identifying, using the machine learning based annotator, multiple candidate entities for each entity of the entities based in part on the entity identifiers for the entities determined to be ambiguous;

selecting, using the machine learning based annotator, a particular entity of the multiple candidate entities for each entity of the entities based in part on information in a user profile of the particular user; and annotating, using the machine learning based annotator, the data that represents actions taken by a particular user with respect to the entities of the plurality of entity types with the respective entity identifiers that each identify the particular entity;

receiving a query from the particular user, wherein the query includes one or more terms that specify one or more entity identifiers indicative of a first entity type and an action taken by the particular user with respect to the entities;

determining entities that are of the first entity type;

querying, within the disambiguated data that represent actions taken by the particular user with respect to entities, for actions taken by the particular user with respect to entities of the first entity type;

generating an answer to the query from the disambiguated data that represent the actions taken by the particular user with respect to entities of the first entity type; and providing the answer to the query to the particular user.

16. The one or more non-transitory computer-readable storage mediums of claim 15, wherein a query specific from the particular user is received by voice inputs from the particular user to the system.

17. The one or more non-transitory computer-readable storage mediums of claim 15, wherein a query specific from the particular user is received by keyboard, mouse, or touchpad inputs from the particular user to the system.

18. The one or more non-transitory computer-readable storage mediums of claim 15, wherein querying the data that represents actions includes:

obtaining search results responsive to the one or more terms of the query.

* * * * *